United States Patent
Li (10) Patent No.: US 10,496,195 B2
(45) Date of Patent: Dec. 3, 2019

(54) TOUCHPAD DEVICE, METHOD OF OPERATING THE TOUCHPAD DEVICE AND COMPUTER READABLE MEDIUM

(71) Applicant: POLO-LEADER ELECTRONIC CO., LTD., Taipei (TW)

(72) Inventor: Wen-Chin Li, Taipei (TW)

(73) Assignee: POLO-LEADER ELECTRONIC CO., LTD. (TW)

( * ) Notice: Subject to any disclaimer, the term of this patent is extended or adjusted under 35 U.S.C. 154(b) by 0 days.

(21) Appl. No.: 16/182,682

(22) Filed: Nov. 7, 2018

(65) Prior Publication Data

US 2019/0138120 A1     May 9, 2019

(30) Foreign Application Priority Data

Nov. 8, 2017    (TW) ............................ 106138625 A (51) Int. Cl.
| | |
|---|---|
| *G06F 3/041* | (2006.01) |
| *G06F 3/0354* | (2013.01) |
| *G06F 3/038* | (2013.01) |

(52) U.S. Cl.
CPC .......... *G06F 3/03547* (2013.01); *G06F 3/038* (2013.01); *G06F 3/0416* (2013.01); *G06F 2203/04104* (2013.01)

(58) Field of Classification Search
CPC .......... G06F 3/041; G06F 3/045; G06F 3/042; G06F 3/043; G06F 3/033; G06F 17/60; G09G 5/08; G04G 9/00; G06Q 30/00
See application file for complete search history.

(56) References Cited

U.S. PATENT DOCUMENTS

| | | | | |
|---|---|---|---|---|
| 2009/0213081 A1* | 8/2009 | Case, Jr. | ............... | G06F 1/1616 345/173 |
| 2013/0150128 A1* | 6/2013 | Tsunoda | .................. | H04M 1/67 455/566 |
| 2013/0293493 A1* | 11/2013 | Shen | ..................... | G06F 3/0488 345/173 |

(Continued)

FOREIGN PATENT DOCUMENTS

| | | |
|---|---|---|
| TW | 201011610 A | 3/2010 |
| TW | 201346656 A | 11/2013 |

*Primary Examiner* — Pegeman Karimi
(74) *Attorney, Agent, or Firm* — Schmeiser, Olsen & Watts, LLP (57) ABSTRACT

A touchpad device includes a touch module, communication unit, memory unit, and processing unit. The processing unit receives a touch input sensed by the touch module, performing touch operation detection, and sending one or more operation signals to a terminal device through the communication unit. The processing unit, when detecting a first touch operation occurs on a first mouse button region and ends, sends an operation signal including indication of continuous pressing of a virtual mouse button. The processing unit, when detecting a second touch operation is a sliding movement of a single touch point after the first touch operation ends, sends coordinates-related messages of the sliding movement. The processing unit, when detecting a third touch operation after the first touch operation ends, sends operation signals including a message indicating release of the virtual mouse button and a message indicating an instruction corresponding to the third touch operation.

10 Claims, 6 Drawing Sheets

(56) References Cited

U.S. PATENT DOCUMENTS

2015/0331510 A1* 11/2015 Wang ................ G06F 3/041
          345/173
2016/0364137 A1* 12/2016 Ren ................... G06F 3/038

* cited by examiner

TOUCHPAD DEVICE, METHOD OF OPERATING THE TOUCHPAD DEVICE AND COMPUTER READABLE MEDIUM

CROSS-REFERENCE TO RELATED APPLICATION

This non-provisional application claims priority under 35 U.S.C. § 119(a) on Patent Application No. 106138625 filed in Taiwan, R.O.C. on Nov. 8, 2017, the entire contents of which are hereby incorporated by reference.

FIELD OF THE INVENTION

The present disclosure relates to touchpad device technology, and in particular to a touchpad device, a method of operating the touchpad device and a computer readable medium thereof.

BACKGROUND OF THE INVENTION

In computer use, a mouse device is an indispensable input device. People have long been accustomed to its operation mode and user experience. The computer operating system and applications also have a large number of operating modes based on the use of the mouse interface. The mouse is still an important input device in the field of applications of personal computers although a variety of products such as touchpads, graphics tablets and so on are available to users as touch technology progresses.

In the case of a notebook computer, the touchpad disposed thereon is still inconvenient for the average user. For example, when the user simulates a drag function of the mouse with the touchpad, the user must have one's finger to press a mechanical button below the touchpad while another finger touches and moves on the touchpad. This approach of operation is quite inconvenient for the user. Hence, many users are still accustomed to using the mouse connected to the notebook computer for a better and smoother user experience.

However, the mouse also limits its technical scalability because the mouse involves mechanical buttons and generates an operation command only when the user causes the movement of the mouse's body or clicks the buttons. For example, it is inconvenient to change or add new operating modes or functions in the mouse. The mouse is also limited by the physical operating space and operating environment. Nevertheless, the current operation of the touchpad on the market does not include the functions of all the buttons of the mouse, and it is not convenient to implement all the functions of the mouse in all related applications.

Moreover, if the user uses the mouse as a pointing device for a long period of time, it will likely cause a so-called "mouse arm" syndrome, which will cause hand injury, also known as carpal tunnel syndrome.

Thus, there is still room for improvement in the configuration of a touchpad device so that the touchpad can include all the functions of the mouse and multi-touch point application functions for precise and flexible operations. Accordingly, it is desirable that the user can control the operation of the terminal device quickly, flexibly and accurately with better experiences.

SUMMARY

An object of the present invention is to provide a touchpad device. The touchpad device may be configured to allow the user to frequently switch between the operation mode of a virtual mouse button function and the operation mode of a multi-touch point function without making operation inefficient, interrupting the operation or causing operation failures. In this way, the user may operate the pointing device function and gesture function more easily, efficiently, and smoothly, thereby controlling the operation of the terminal device.

According to some embodiments of the disclosure, a touchpad device is provided for communicating with a terminal device so as to provide functionality of a touchpad or pointing device for the terminal device. The touchpad device comprises a touch module, a communication unit, a memory unit, and a processing unit. The touch module is used for sensing a touch input, and has a sensing surface including a plurality of functional regions and a detection portion electrically coupled to the sensing surface. The communication unit is used for communication with the terminal device. The processing unit, electrically coupled to the detection portion of the touch module, the memory unit, and the communication unit, is used for receiving the touch input sensed by the touch module and performing touch operation detection accordingly, and sending at least one corresponding operation signal to the terminal device through the communication unit. When the processing unit detects that a first touch operation occurs on a first mouse button region of the functional regions and ends, the processing unit sends a first operation signal to the terminal device through the communication unit, the first operation signal includes a message indicating continuous pressing of a first virtual mouse button, the first virtual mouse button represents one of left, middle, right buttons of a virtual mouse device. When the processing unit detects that a second touch operation on the sensing surface is a sliding movement of a single touch point after the first touch operation ends, the processing unit sends a plurality of second operation signals to the terminal device through the communication unit, the second operation signals include coordinates-related messages of the sliding movement. When the processing unit detects that a third touch operation on the sensing surface is not the first touch operation after the first touch operation ends, the processing unit sends a third operation signal and at least one fourth operation signal to the terminal device through the communication unit, the third operation signal includes a message indicating release of the first virtual mouse button and the at least one fourth operation signal includes a message indicating an instruction corresponding to the third touch operation.

According to some embodiments of the disclosure, a method for operation of a touchpad device is provided, wherein the touchpad device is used for communication with a terminal device so as to provide functionality of a touchpad or pointing device for the terminal device. The method includes the following the steps. Receiving a touch input sensed by a sensing surface of the touchpad device and performing touch operation detection accordingly so as to determine what type of touch operation the touch input indicates and whether the touch input occurs on a first mouse button region of a plurality of functional regions on the sensing surface are performed. Upon determination that the touch input is a first touch operation on the first mouse button region and the first touch operation ends, a first operation signal including a message indicating continuous pressing of a first virtual mouse button which represents one of left, middle, right buttons of a virtual mouse device is sent to the terminal device. Upon determination that the touch input is a second touch operation which is a sliding movement of a single touch point on the sensing surface after the first touch operation ends, a plurality of second operation signals including coordinates-related messages of the sliding movement is sent to the terminal device. Upon determination that the touch input is a third touch operation on the sensing surface which is not the first touch operation after the first touch operation ends, a third operation signal and at least one fourth operation signal are sent to the terminal device, wherein the third operation signal includes a message indicating release of the first virtual mouse button and the at least one fourth operation signal includes a message indicating an instruction corresponding to the third touch operation.

According to some embodiments of the disclosure, a non-transitory readable medium is provided, in which program code is stored for causing a computing device to perform a method for operation of a touchpad device, as exemplified above.

According to the above embodiments, the touchpad device may be configured to allow the user to frequently switch between the operation mode of a virtual mouse button function and the operation mode of a multi-touch point function without making operation inefficient, interrupting operation or causing operation failures. In this way, the user may operate the pointing device function and gesture function more easily, efficiently, and smoothly, thereby controlling the operation of the terminal device.

BRIEF DESCRIPTION OF THE DRAWINGS

The structure and the technical manner adopted by the present disclosure to achieve the above and other objects can be best understood by referring to the following detailed description of the preferred embodiments and the accompanying drawings, wherein.

DETAILED DESCRIPTION OF THE PREFERRED EMBODIMENTS

To facilitate understanding of the objects, characteristics and effects of this present disclosure, embodiments together with the attached drawings for the detailed description of the present disclosure are provided.

Figure 1:
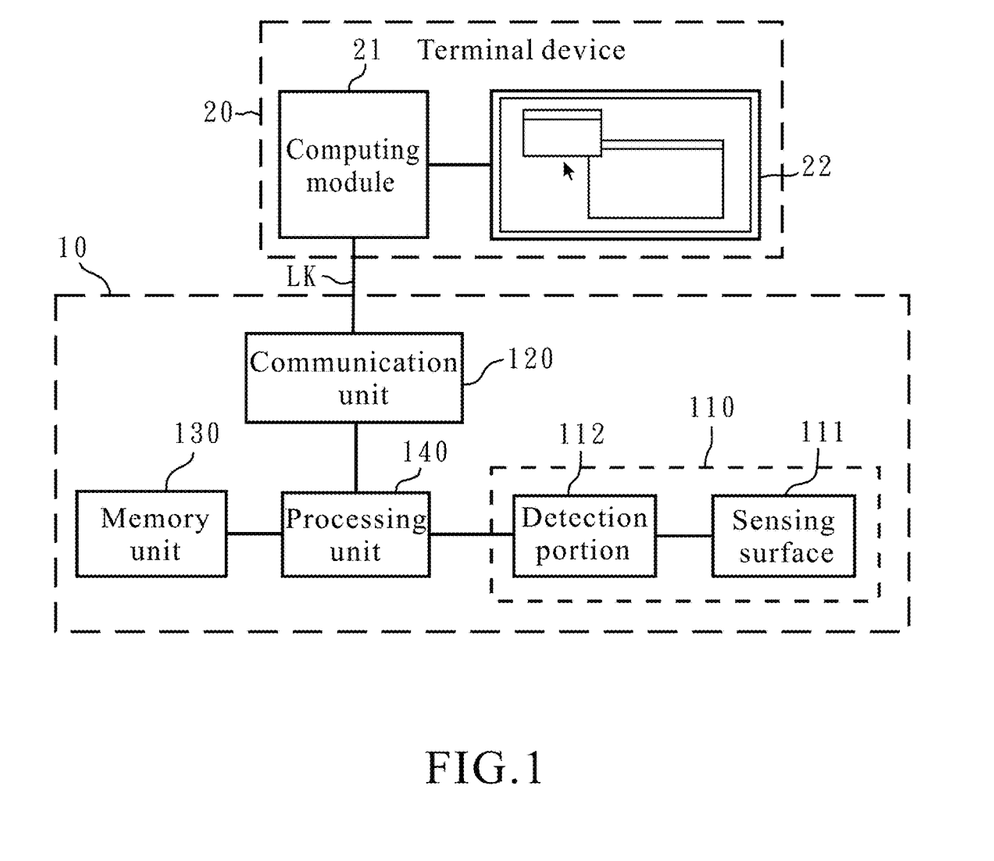
FIG. 1 is a block diagram illustrating a touchpad device according to an embodiment of the disclosure with a terminal device.

Referring to FIG. 1, a touchpad device is illustrated according to an embodiment of the disclosure with a terminal device in a block diagram. As shown in FIG. 1, a touchpad device 10 communicates with a terminal device 20 through a communication link LK so as to control the terminal device 20, according to an embodiment of the disclosure. For example, the touchpad device 10 may be implemented as an input peripheral device for the terminal device 20. The communication link LK may be, for example, a wired or wireless communication link, such as USB, Bluetooth (various Bluetooth versions 1.0 to 4.0 or above), Zigbee, or any other wired or wireless link. The terminal device 20 may be a desktop computer, notebook computer, industrial computer, smart television, or any other device.

As shown in FIG. 1, the touchpad device 10 is employed as an input device for the terminal device 20. A touch input on the touchpad device 10 by a user is to be converted into a corresponding control signal and transmitted to the computing module 21 of the terminal device 20 through the communication link LK. The computing module 21 includes, for example, a processing unit and a communication unit, for executing firmware system programs, an operating system, or application programs, and displaying a user interface of any one of the programs on a display unit 22. A touch input on the touchpad device 10 by the user is capable of controlling an operation of the terminal device 20, for example, causing a cursor to move on the user interface, causing processing with respect to a window, object, or data of a user interface.

For example, the touchpad device 10 may be implemented as an input device to provide both virtual mouse and multi-touch point functions. In this example, the touchpad device 10 may be configured to allow the user to frequently switch between the operation mode of a virtual mouse button function and the operation mode of a multi-touch point function without rendering operation inefficient, interrupting operation or causing operation failures. In this way, the user may operate the pointing device function and gesture function of the terminal device more easily, efficiently, and smoothly.

As shown in FIG. 1, the touchpad device 10 includes a touch module 110, a communication unit 120, a memory unit 130, and a processing unit 140.

Figure 2:
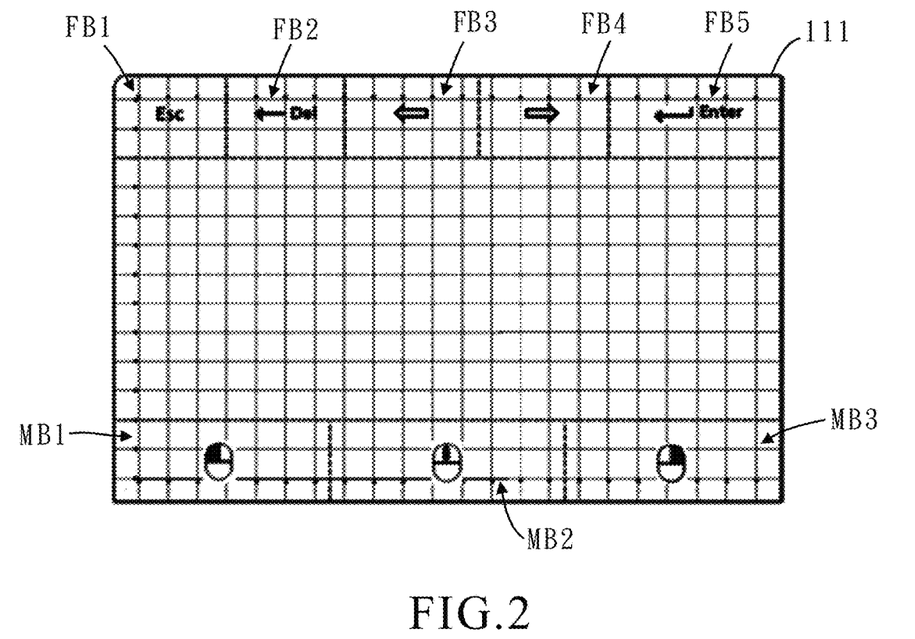
FIG. 2 is a schematic diagram illustrating a sensing surface of the touchpad device according to an embodiment of the disclosure.
Figure 3:
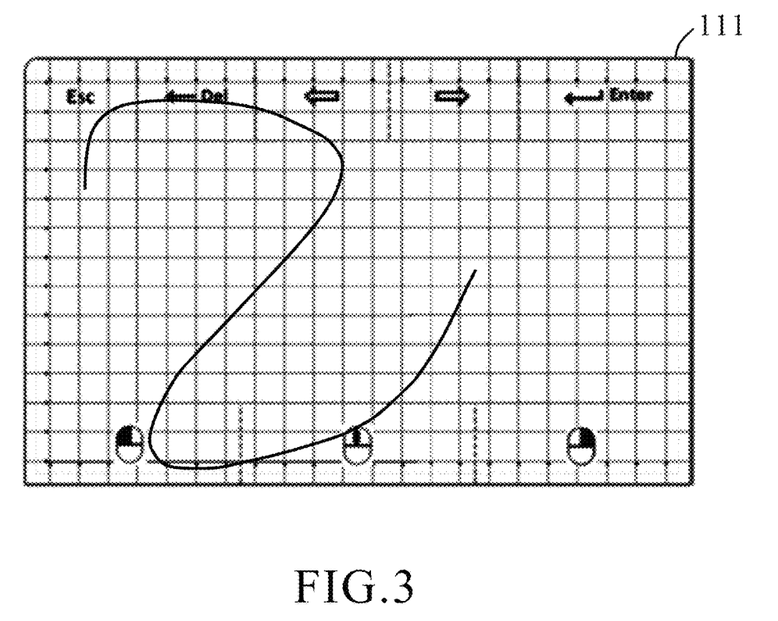
FIG. 3 is a schematic diagram illustrating an arbitrary movement of a single touch point on the sensing surface according to an embodiment of the disclosure.

The touch module 110 is employed for sensing a touch input. The touch module 110 has a sensing surface 111, and a detection portion 112. The detection portion 112 is electrically coupled to the sensing surface 111. For example, the sensing surface 111 and detection portion 112 may be implemented by using one or more circuits or components including resistive, capacitive or other sensing traces, position sensing circuit(s), and drive circuit(s). Referring to FIG. 2, a sensing surface 111 of the touchpad device 10 is illustrated according to an embodiment of the disclosure. As shown in FIG. 2, the sensing surface 111 includes a plurality of functional regions and a region other than the functional regions. For example, the functional regions include mouse button regions MB1 to MB3 and key regions FB1 to FB5. For example, the user performs a corresponding touch operation on any one of the functional regions so as to perform a corresponding function. If the user performs a touch operation (e.g., a single click) on one of the key regions FB1 to FB5, it indicates a corresponding key being pressed (e.g., escape key, delete key, left arrow key, right arrow key, or enter key). In addition, the longitudinal and transversal lines are illustrated in FIG. 2 to indicate that the sensing surface 111 is associated with a coordinate system and the detection portion 112 is capable of generating sensed data of a touch input according to the coordinate system (e.g., coordinates of a touch point). Referring to FIG. 3, an arbitrary movement of a single touch point on the sensing surface 111 is illustrated by a curve according to an embodiment in a schematic diagram. In addition, as illustrated in FIG. 3, a touch input by the user, for example, the movement of a single touch point corresponding to the movement of a cursor, may cross different the functional regions and the other region on the sensing surface 111, without causing erratic touch operation. The implementation of the disclosure is not limited to the above examples.

The communication unit 120 is used for communication with the terminal device 20. For example, the communication unit 120 may be implemented to include a wired or wireless communication circuit module, such as USB, Bluetooth (various Bluetooth versions 1.0 to 4.0 or above), or Zigbee module, or any other wired or wireless communication circuit module, so as to establish a wired or wireless communication link LK with the terminal device 20.

The memory unit 130 is used for storing data such as data for operation, setting parameters, or programs of the touch module 110.

The processing unit 140 is electrically coupled to the detection portion 112, the memory unit 130, and the communication unit 120 of the touch module 110. The processing unit 140 is utilized for receiving a touch input sensed by the touch module 110 and performing touch operation detection accordingly, and sending at least one corresponding operation signal to the terminal device 20 through the communication unit 120. Regarding the touch operation detection, for example, the processing unit 140 determines what type of touch operation the touch input indicates and whether the touch input occurs on any one of the functional regions of the sensing surface, for example, whether the touch input occurs on any one of the mouse button regions MB1 to MB3. In addition, the touch operation that the touch input indicates may be regarded as a corresponding touch function with respect to the touchpad device 10; or the touch operation that the touch input indicates may be regarded as a touch event corresponding to or generated by at least one touch point detected by the touchpad device 10 with respect to time.

Figure 4:
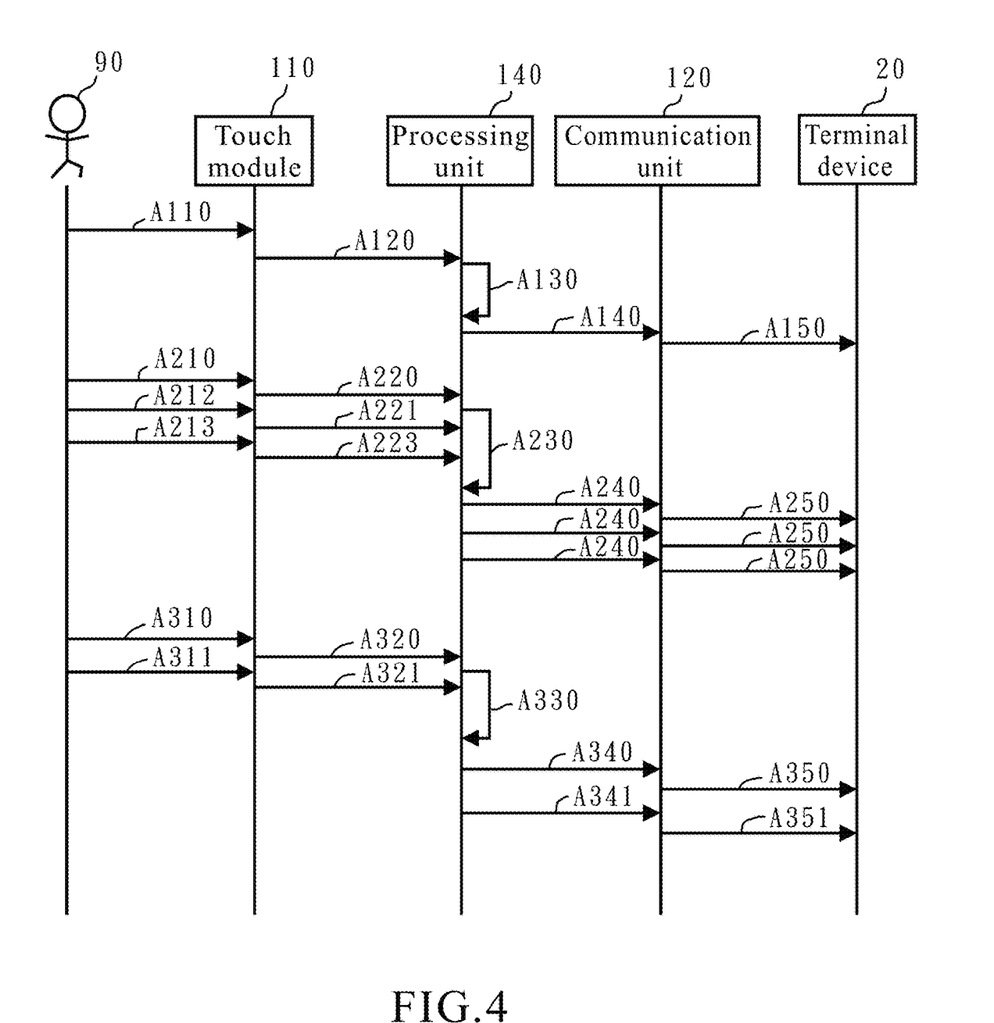
FIG. 4 is a sequence diagram illustrating internal operations of the touchpad device of FIG. 1 and communication with the terminal device, according to an embodiment of the disclosure.

Referring to FIG. 4, a sequence diagram illustrates internal operations of the touchpad device 10 of FIG. 1 and communication with the terminal device 20, according to an embodiment of the disclosure. In FIG. 4, as indicated by arrow A110, the user 90 performs a touch operation; the touch module 110 detects a touch input in response to the touch operation, as illustrated by A120. As indicated by arrow A130, the processing unit 140 receives the touch input and performs touch operation detection. When detecting that a first touch operation occurs on a first mouse button region of the functional regions and ends, the processing unit 140 sends a first operation signal to the terminal device 20 through the communication unit 120, as indicated by arrows A140 and A150. The first operation signal includes a message indicating continuous pressing of a first virtual mouse button which represents one of left, middle, right buttons of a virtual mouse device.

In FIG. 4, as indicated by arrows A210 to A213, the user 90 performs a touch operation; the touch module 110 detects a touch input in response to the touch operation, as indicated by arrows A220 to A223. As indicated by arrow A230, the processing unit 140 receives the touch input and performs touch operation detection. When detects that a second touch operation on the sensing surface 111 is a sliding movement of a single touch point after the first touch operation ends, the processing unit 140 sends a plurality of second operation signals to the terminal device 20 through the communication unit 120, as indicated by arrows A240 and A250. The second operation signals include coordinates-related messages of the sliding movement corresponding to the second touch operation.

In FIG. 4, as indicated by arrows A310 and A311, the user 90 performs a touch operation. The touch module 110 detects a touch input in response to the touch operation, as indicated by arrows A320 and A321. As indicated by arrow A330, the processing unit 140 receives the touch input and performs touch operation detection. When detecting that a third touch operation on the sensing surface 111 is not the first touch operation or not the second touch operation after the first touch operation ends, the processing unit 140 sends a third operation signal and at least one fourth operation signal to the terminal device 20 through the communication unit 120, as indicated by arrows A340-A341 and A350-A351. The third operation signal includes a message indicating release of the first virtual mouse button and the at least one fourth operation signal includes a message indicating an instruction corresponding to the third touch operation.

In an embodiment, the third touch operation is a touch operation based on a plurality of touch points, and the instruction message included in the fourth operation signal is an instruction corresponding to the touch operation based on the touch points.

In an embodiment, the first touch operation is a touch operation based on a single touch point, for example, a click. In an embodiment, when the processing unit 140 detects that a touch operation which occurs on the sensing surface but not on the mouse button region is a single touch operation of a single touch point (e.g., a click) after the first touch operation ends, the processing unit 140 sends a message including release of the first virtual mouse button to the terminal device 20 through the communication unit 120.

Figure 5:
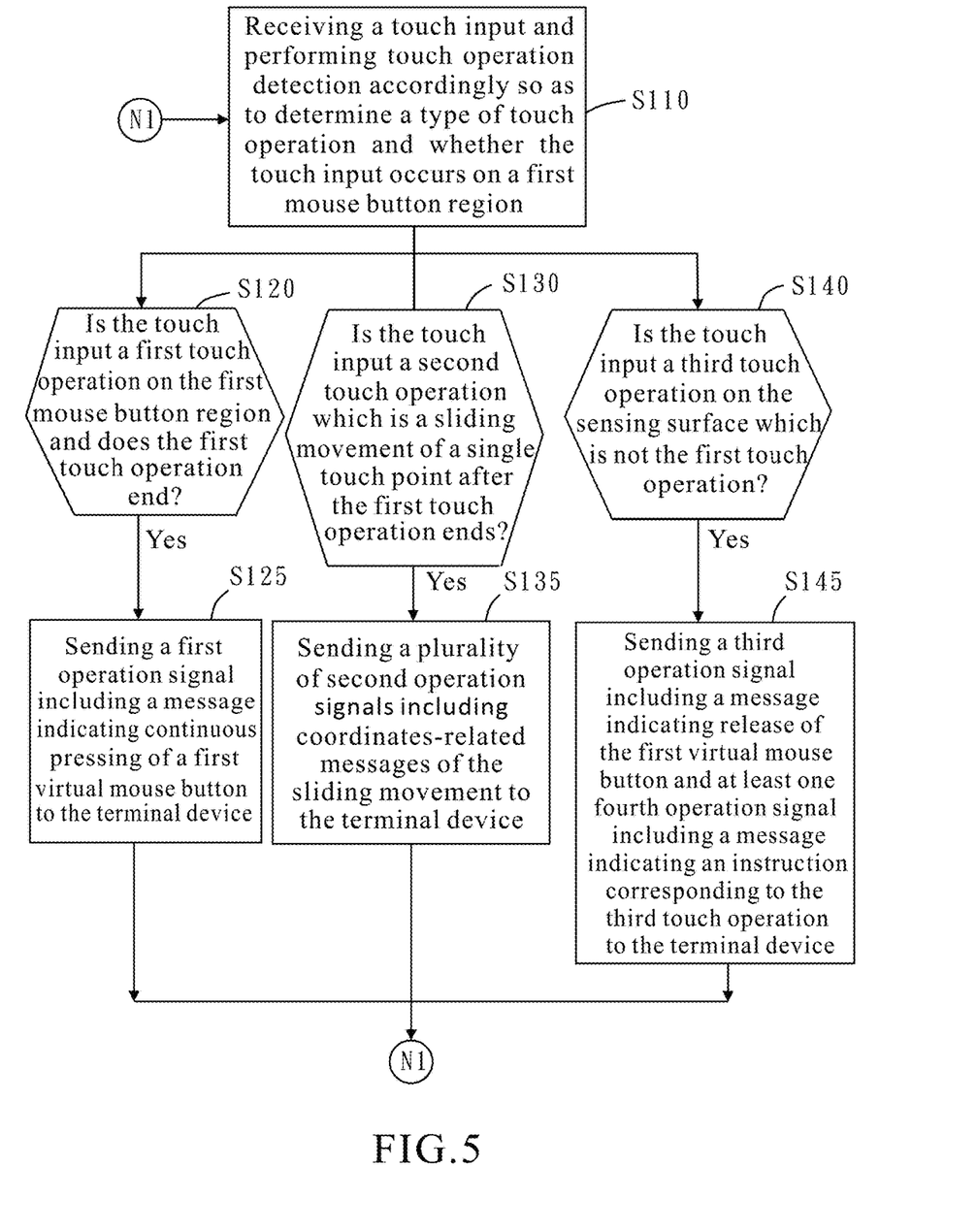
FIG. 5 is a schematic flowchart illustrating a method for operation of a touchpad device according to another embodiment of the disclosure.

Referring to FIG. 5, a schematic flowchart illustrates a method for operation of a touchpad device 10 according to another embodiment of the disclosure. The method may be performed in the touchpad device, as described above, such that the touchpad device is capable of communicating with the terminal device 20 so as to provide functionality of a touchpad or pointing device for the terminal device 20, and further control the terminal device 20. The method includes the steps as shown in FIG. 5.

As shown in step S110, a touch input sensed by a sensing surface 111 of the touchpad device 10 is received and touch operation detection is performed accordingly so as to determine as to what type of touch operation the touch input indicates and whether the touch input occurs on a first mouse button region of a plurality of functional regions on the sensing surface 111.

As shown in step S120, it is determined whether the touch input is a first touch operation on the first mouse button region and the first touch operation ends. When it is determined that the touch input is the first touch operation on the first mouse button region and the first touch operation ends, as shown in step S125, a first operation signal is sent to the terminal device 20 through the communication unit 120. The first operation signal includes a message indicating continuous pressing of a first virtual mouse button which represents one of left, middle, right buttons of a virtual mouse device.

As shown in step S130, it is determined as to whether the touch input is a second touch operation which is a sliding movement of a single touch point on the sensing surface 111 after the first touch operation ends. When it is determined that the touch input is a second touch operation which is a sliding movement of a single touch point on the sensing surface 111 after the first touch operation ends, as shown in step S135, a plurality of second operation signals are sent to the terminal device 20 through the communication unit 120, wherein the second operation signals include coordinates-related messages of the sliding movement corresponding to the second touch operation.

As shown in step S140, it is determined as to whether the touch input is a third touch operation on the sensing surface 111 which is not the first touch operation after the first touch operation ends. When it is determined that the touch input is a third touch operation on the sensing surface 111 which is not the first touch operation after the first touch operation ends, as shown in step S145, a third operation signal and at least one fourth operation signal are sent to the terminal device 20 through the communication unit 120. The third operation signal includes a message indicating release of the first virtual mouse button and the at least one fourth operation signal includes a message indicating an instruction corresponding to the third touch operation.

In the embodiment as shown in FIG. 5, by performing the method, the touchpad device may be configured to allow the user to frequently switch between the operation mode of a virtual mouse button function and the operation mode of a multi-touch point function without making operation inefficient, interrupting the operation or causing operation failures. In this way, the user may operate the pointing device function and gesture function more easily, efficiently, and smoothly, thereby controlling the operation of the terminal device.

In addition, in an embodiment based on FIG. 5, the first touch operation is a touch operation based on a single touch point. In an embodiment, the method further includes: when it is determined that the touch input is a single touch operation based on a single touch point (e.g., a click) on the sensing surface 111 after the first touch operation ends, an operation signal including a message indicating release of the first virtual mouse button is sent to the terminal device 20 through the communication unit 120.

Figure 7:
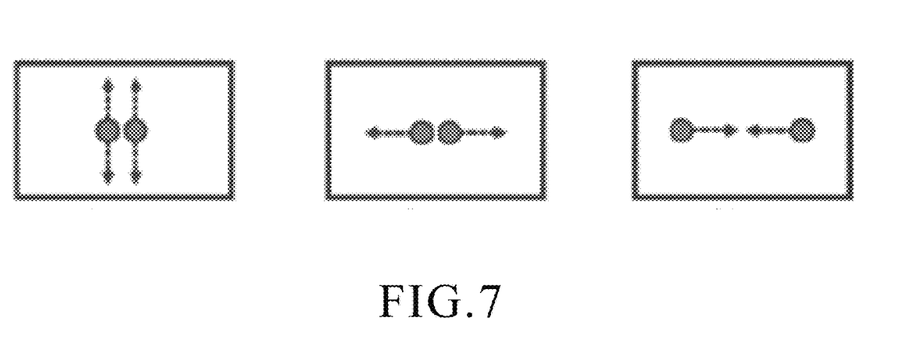
FIG. 7 is a schematic diagram illustrating some examples of touch operations based on a plurality of touch points.
Figure 8:
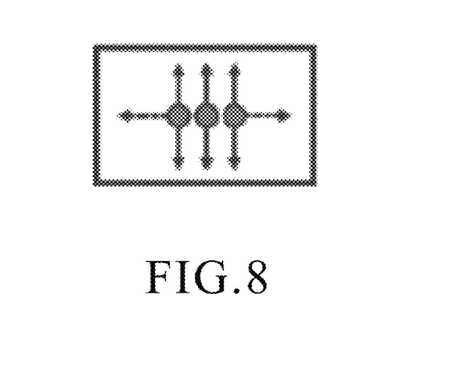
FIG. 8 is a schematic diagram illustrating some examples of touch operations based on a plurality of touch points.

In an embodiment, the third touch operation is a touch operation based on a plurality of touch points, and the message included in the fourth operation signal indicates an instruction corresponding to the touch operation based on the touch points. Some examples of touch operations based on a plurality of touch points are illustrated in FIGS. 6 to 8 in schematic diagrams.

Figure 6:
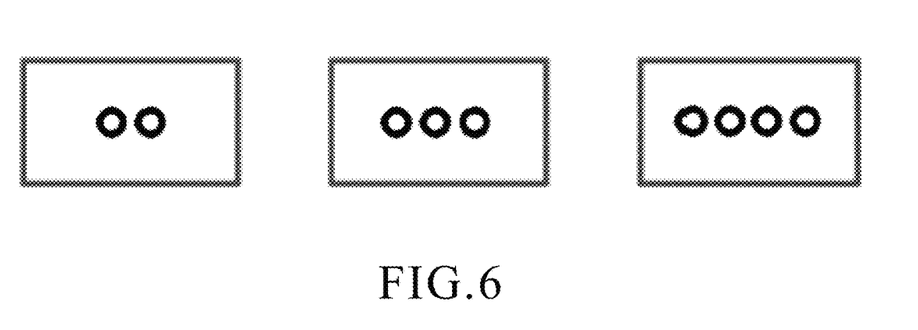
FIG. 6 is a schematic diagram illustrating some examples of touch operations based on a plurality of touch points.

For example, as shown in the block on the left side of FIG. 6, a touch operation by the user is that two fingers quickly touch the sensing surface 111 at the same time and then leave the sensing surface 111. The corresponding fourth operation signal is a command of the click function of the right mouse button.

As shown in the block in the middle of FIG. 6, a touch operation by the user is that three fingers quickly touch the sensing surface 111 once at the same time and then leave the sensing surface 111. The corresponding fourth operation signal is a command of a key combination of 'Windows-Key'+'Q', which is sent when the terminal device 20 is running an operating system such as Windows 10 that supports a three-finger gesture function.

As shown in the block on the right side of FIG. 6, a touch operation by the user is that four fingers quickly touch the sensing surface 111 once at the same time and then leave the sensing surface 111. The corresponding fourth operation signal is a command of a key combination of 'Windows-Key'+'A', which is sent when the terminal device 20 is running an operating system such as Windows 10 that supports a four-finger gesture function.

For example, as shown in the block on the left side of FIG. 7, a touch operation by the user is that two fingers move vertically on the sensing surface 111 at the same time to control a scrolling function of a scroll wheel of a virtual mouse device. The corresponding fourth operation signal is a command for a mouse wheel scrolling function.

As shown in the middle block of FIG. 7, a touch operation by the user is that two fingers move to the left and right sides and gradually away from each other on the sensing surface 111 to control a zooming out function with the wheel of a virtual mouse device. The corresponding fourth operation signal is a command for the zooming out function with the mouse wheel: 'Ctrl'+mouse wheel delta (positive value), which represents a command indicating a 'Ctrl' key being pressed and a delta value of the mouse wheel being scrolled up, wherein the delta value is positive.

As shown in the right block of FIG. 7, a touch operation by the user is that two fingers move to the left and right sides and gradually closer to each other on the sensing surface 111 to control a zooming in function with the mouse wheel. The corresponding fourth operation signal is a command for the zooming in function with the mouse wheel: 'Ctrl'+mouse wheel delta (negative value), which represents a command indicating a 'Ctrl' key being pressed and a delta value of the mouse wheel being scrolled down, wherein the delta value is negative.

As shown in the block in FIG. 8, a touch operation by the user is that three fingers on the sensing surface 111 and performing one of touch operations of moving them up, moving them down, moving them left, and moving them right so as to call a corresponding function about a multi-task windows list, such as showing all windows, showing windows with smaller views in an arranged manner, switching to a next window, and switching to a previous window, respectively. The corresponding fourth operation signal is a command for a function about a multi-task windows list, for example, a "Task View" command, a command of a key combination of "Alt+Tab" or other related applicable commands.

Figure 9:
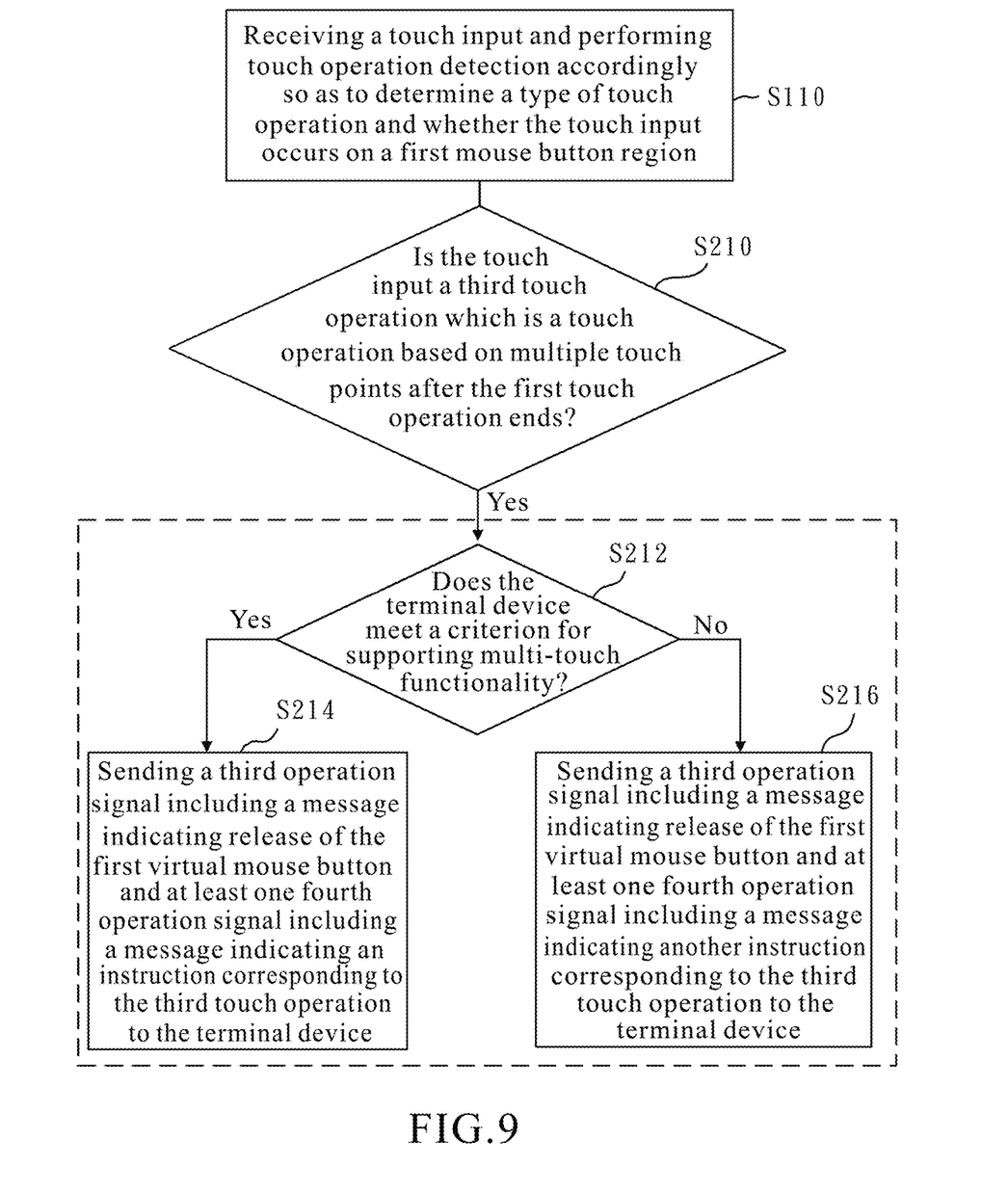
FIG. 9 is a schematic flowchart illustrating a method for operation of a touchpad device according to another embodiment of the disclosure.

Referring to FIG. 9, another embodiment of a method of operating a touch device is illustrated in a schematic flow-chart. In this embodiment, the method of operating the touch device can be further implemented to change the operation signal transmitted by the touch device to the terminal device 20 according to a corresponding function supported by the version of the operating system used by the terminal device 20, so that the touch device is capable of providing an efficient and smooth user experience to the user with respect to the environment of the different operating systems of the terminal device 20.

The embodiment of FIG. 9 differs from that of FIG. 5 in that the method in FIG. 9 has additional steps when a third touch operation is detected. Referring to FIG. 9, in step S210, a determination is made as to whether the touch input is a third touch operation on the sensing surface 111 after the first touch operation ends, wherein the third touch operation is a touch operation based on multiple touch points. When the determination result in step S210 is affirmative, as shown in step S212, a determination is further made as to whether the terminal device 20 meets a criterion for supporting multi-touch functionality, for example, whether the operating system of the terminal device 20 supports a standard for multi-touch functionality such as precision touchpad protocol (PTP) by Microsoft®. As an example, a criterion for checking multi-touch functionality support is whether the version of the operating system of the terminal device 20 is Windows 10 or the above. If the criterion of step S212 is satisfied, as shown in step S214, a third operation signal and at least one fourth operation signal are sent to the terminal device 20 through the communication unit 120. The third operation signal includes a message indicating release of the first virtual mouse button and the at least one fourth operation signal includes a message indicating an instruction corresponding to the third touch operation. For example, the touch operations as indicated by the blocks in the middle and on the right side of FIG. 6 are supported by the operating systems such as Windows 10 or above. For example, the touch operation as indicated by the block in the middle of FIG. 6 is that three fingers quickly touch the sensing surface 111 once at the same time and then leave the sensing surface 111. The corresponding fourth operation signal is a command of a key combination of 'Windows-Key'+'Q', which is sent to the terminal device 20 for calling of three-finger gesture function by Microsoft® Windows 10. If the criterion of step S212 is not satisfied, for example, the operating system of the terminal device 20 is Windows 8, 7 or older version, as shown in step S216, the third operation signal and at least one fourth operation signal are sent to the terminal device 20 through the communication unit 120, wherein the corresponding fourth operation signal is a command of a function key 'F1', which is sent to the terminal device 20 for calling of help and support by Microsoft® Windows 10. In addition, steps S212 to S216 in FIG. 9 may be viewed as another embodiment of step S145 in FIG. 5.

In addition, in FIG. 5 or 9, the method may be repeated from step S110, for example, as indicated by node N1, or performs other processing after the operation signal of step S125 to S145, S214, or S216 is sent. Any embodiment based on FIG. 5 may be realized by one or more software programs to control the touchpad device 10 by adopting such as event-driven approach, conditional looping, or any other approach. The step S120, S130, or S140 may be represented by event determination in the program. If a determination result is negative, the method may proceed to make a determination with another criterion, repeat from step S110, or do other processing. In addition, in embodiments in practice, the memory unit 130 of the touchpad device 10 may be utilized for storing operating parameters involved in steps S110 to S145, such as the type of a touch operation, which mouse button region in the functional regions the touch input occurs, the state of continuous pressing of the first virtual mouse button, types of touch operations occurring in sequence, and so on. The operating parameters may be read from the memory unit 130 for determination involved in the step S130 or S140 in implementation.

In addition, the method may further include the following. A touch input sensed by the sensing surface 111 of the touchpad device 10 is received and touch operation detection is performed accordingly. A determination is made accordingly as to what type of touch operation the touch input indicates and whether the touch input occurs on a key region of a plurality of functional regions (e.g., one of FB1 to FB5 in FIG. 2) on the sensing surface 111 so as to output an operation signal corresponding to pressing of a key to the terminal device 20. However, the implementation of the disclosure is not limited to the examples of the key region.

In addition, in some embodiments based on FIG. 5, while the first virtual mouse button is in the state of being pressed (i.e., after step S120, S125), the second or third touch operation of the step S130 or S140 may be performed on a mouse button region or a key region, or across a number of the functional regions, for example, that as illustrated in FIG. 3, without causing any wrong determination.

Regarding the embodiments of FIG. 5 or 9, the touchpad device 10 may be further configured to include a state display unit for displaying the state of the touchpad device 10, for example, by using an LED to display the state of a mouse button region (e.g., a left, middle, or right key) being pressed or being on or off, or the version of the operating system (e.g., the version of Windows). However, the implementation of the touchpad device is not limited to the above examples.

In addition, in some embodiments, provided is a computer readable storage medium which is non-transitory, storing program code which, when executed, may cause a computing device, for example, the above touchpad device or a computing device that includes the touchpad device, to execute the method for operating the touchpad device, wherein the method includes any one of the embodiments or combination thereof according to FIG. 5 or 9. The program code, for example, includes one or more programs or program modules for implementing step S110, S120, S125 to S145 according to FIG. 5, and the program code of the program modules cooperates each other, and may be executed in any appropriate sequence. The program code, when executed by the computing device (e.g., any one of the embodiment of the touchpad device according to FIG. 1), causes the computing device to execute the method for operating the touchpad device of any one of the embodiments according to FIG. 5 or 9. The examples of the storage medium include, for example, firmware, ROM, RAM, memory card, optical information storage medium, magnetic information storage medium or any other type of storage medium or memory. However, the implementation of the touchpad device is not limited to the above examples.

Based on embodiments of FIGS. 1 to 5 and 9, the touchpad device 10 may be configured to allow the user to frequently switch between the operation mode of a virtual mouse button function (e.g., emulation of a sliding movement of a virtual mouse device while a virtual mouse button being pressed, or emulation of mouse dragging) and the operation mode of a multi-touch point function (e.g., gesture function of multi-touch points), without making operation inefficient, interrupting the operation or causing operation failures. In this way, the user may operate the pointing device function and gesture function more easily, efficiently, and smoothly, thereby controlling the operation of the terminal device.

For the users, even though the first touch operation (e.g., a single click) has been performed so as to have the touchpad device 10 being in the state of the first virtual mouse button being pressed, the touchpad device 10 enables the user to directly perform the third touch operation (e.g., an operation of multi-touch points) which is not the first touch operation, without the need for performing the touch operation for releasing the first virtual mouse button (e.g., a single click).

For the terminal device 20, the touchpad device 10 may be emulated as an apparatus of a combination of a mouse device and a touchpad. Even though operations of switching or alternating between instructions of the mouse device and the touchpad are applied to the touchpad device 10, the operating system or application programs of the terminal device 20 will not make wrong judgement, perform wrong data reading, make operation inefficient, interrupt operation or cause operation failures.

As discussed above, the touchpad device 10 is capable of enabling the user to operate efficiently, easily, and smoothly on the pointing and gesture functionality of the terminal device, thereby controlling the terminal device. From another point of view, the touchpad device according to the present disclosure can effectively replace the traditional mouse, allowing the user to have a better experience in controlling the terminal device and in function expansion. With the touchpad device, the chance that the traditional mechanical mouse device may hurt the user's hand can be reduced or avoided.

While the present disclosure has been described by means of specific embodiments, numerous modifications and variations could be made thereto by those skilled in the art without departing from the scope and spirit of the present disclosure set forth in the claims.

What is claimed is:

1. A touchpad device for communicating with a terminal device so as to provide functionality of a touchpad or pointing device for the terminal device, the touchpad device comprising:
    a touch module for sensing a touch input, having a sensing surface and a detection portion electrically coupled to the sensing surface, the sensing surface including a plurality of functional regions;
    a communication unit for communication with the terminal device;
    a memory unit;
    a processing unit electrically coupled to the detection portion of the touch module, the memory unit, and the communication unit, for receiving the touch input sensed by the touch module and performing touch operation detection accordingly, and sending at least one corresponding operation signal to the terminal device through the communication unit;
    wherein when the processing unit detects that a first touch operation occurs on a first mouse button region of the functional regions and ends, the processing unit sends a first operation signal to the terminal device through the communication unit, the first operation signal includes a message indicating continuous pressing of a first virtual mouse button, the first virtual mouse button represents one of left, middle, right buttons of a virtual mouse device;
    when the processing unit detects that a second touch operation on the sensing surface is a sliding movement of a single touch point after the first touch operation ends, the processing unit sends a plurality of second operation signals to the terminal device through the communication unit, the second operation signals include coordinates-related messages of the sliding movement;
    when the processing unit detects that a third touch operation on the sensing surface is not the first touch operation after the first touch operation ends, the processing unit sends a third operation signal and at least one fourth operation signal to the terminal device through the communication unit, the third operation signal includes a message indicating release of the first virtual mouse button and the at least one fourth operation signal includes a message indicating an instruction corresponding to the third touch operation, wherein the third touch operation is a touch operation based on a plurality of touch points, not occurring on the first mouse button region.

2. The touchpad device according to claim 1, wherein when the processing unit detects that a touch operation on the sensing surface is a single touch operation of a single touch point after the first touch operation ends, the processing unit sends a message including release of the first virtual mouse button to the terminal device through the communication unit.

3. The touchpad device according to claim 1, wherein the first touch operation is a touch operation based on a single touch point.

4. The touchpad device according to claim 1, wherein the processing unit is capable of detecting that the second touch operation on the sensing surface includes a sliding movement of a single touch point across the first mouse button region.

5. A method for operation of a touchpad device, the touchpad device for communication with a terminal device so as to provide functionality of a touchpad or pointing device for the terminal device, the method comprising:
    receiving a touch input sensed by a sensing surface of the touchpad device and performing touch operation detection accordingly so as to determine what type of touch operation the touch input indicates and whether the touch input occurs on a first mouse button region of a plurality of functional regions on the sensing surface;
    sending, to the terminal device, a first operation signal including a message indicating continuous pressing of a first virtual mouse button which represents one of left, middle, right buttons of a virtual mouse device, the sending of the first operation signal being performed upon determination that the touch input is a first touch operation on the first mouse button region and the first touch operation ends;
    sending a plurality of second operation signals including coordinates-related messages to the terminal device upon determination that the touch input is a second touch operation which is a sliding movement of a single touch point on the sensing surface after the first touch operation ends, and the coordinates-related messages being corresponding to the sliding movement; and
    sending a third operation signal and at least one fourth operation signal to the terminal device upon determination that the touch input is a third touch operation on the sensing surface which is not the first touch operation after the first touch operation ends, the third operation signal including a message indicating release of the first virtual mouse button, and the at least one fourth operation signal including a message indicating an instruction corresponding to the third touch operation, wherein the third touch operation is a touch operation based on a plurality of touch points, not occurring on the first mouse button region.

6. The method according to claim 5, wherein the method further comprises sending a message including release of the first virtual mouse button to the terminal device upon determination that the touch input is a touch operation on the sensing surface which is a single touch operation of a single touch point not on the first mouse button region after the first touch operation ends.

7. The method according to claim 5, wherein the first touch operation is a touch operation based on a single touch point.

8. A non-transitory readable medium, in which program code is stored for causing a computing device to perform a method for operation of a touchpad device, the method comprising:

receiving a touch input sensed by a sensing surface of the touchpad device and performing touch operation detection accordingly so as to determine what type of touch operation the touch input indicates and whether the touch input occurs on a first mouse button region of a plurality of functional regions on the sensing surface;

sending, to the terminal device, a first operation signal including a message indicating continuous pressing of a first virtual mouse button which represents one of left, middle, right buttons of a virtual mouse device, the sending of the first operation signal being performed upon determination that the touch input is a first touch operation on the first mouse button region and the first touch operation ends;

sending a plurality of second operation signals including coordinates-related messages to the terminal device upon determination that the touch input is a second touch operation which is a sliding movement of a single touch point on the sensing surface after the first touch operation ends, the coordinates-related messages being corresponding to the sliding movement; and sending a third operation signal and at least one fourth operation signal to the terminal device upon determination that the touch input is a third touch operation on the sensing surface which is not the first touch operation after the first touch operation ends, the third operation signal including a message indicating release of the first virtual mouse button, and the at least one fourth operation signal including a message indicating an instruction corresponding to the third touch operation, wherein the third touch operation is a touch operation based on a plurality of touch points, not occurring on the first mouse button region.

9. The non-transitory readable medium according to claim 8, wherein the method further comprises sending a message including release of the first virtual mouse button to the terminal device, upon determination that the touch input is a touch operation on the sensing surface which is a single touch operation of a single touch point not on the first mouse button region after the first touch operation ends.

10. The non-transitory readable medium according to claim 8, wherein the first touch operation is a touch operation based on a single touch point.

* * * * *